Figure 1:
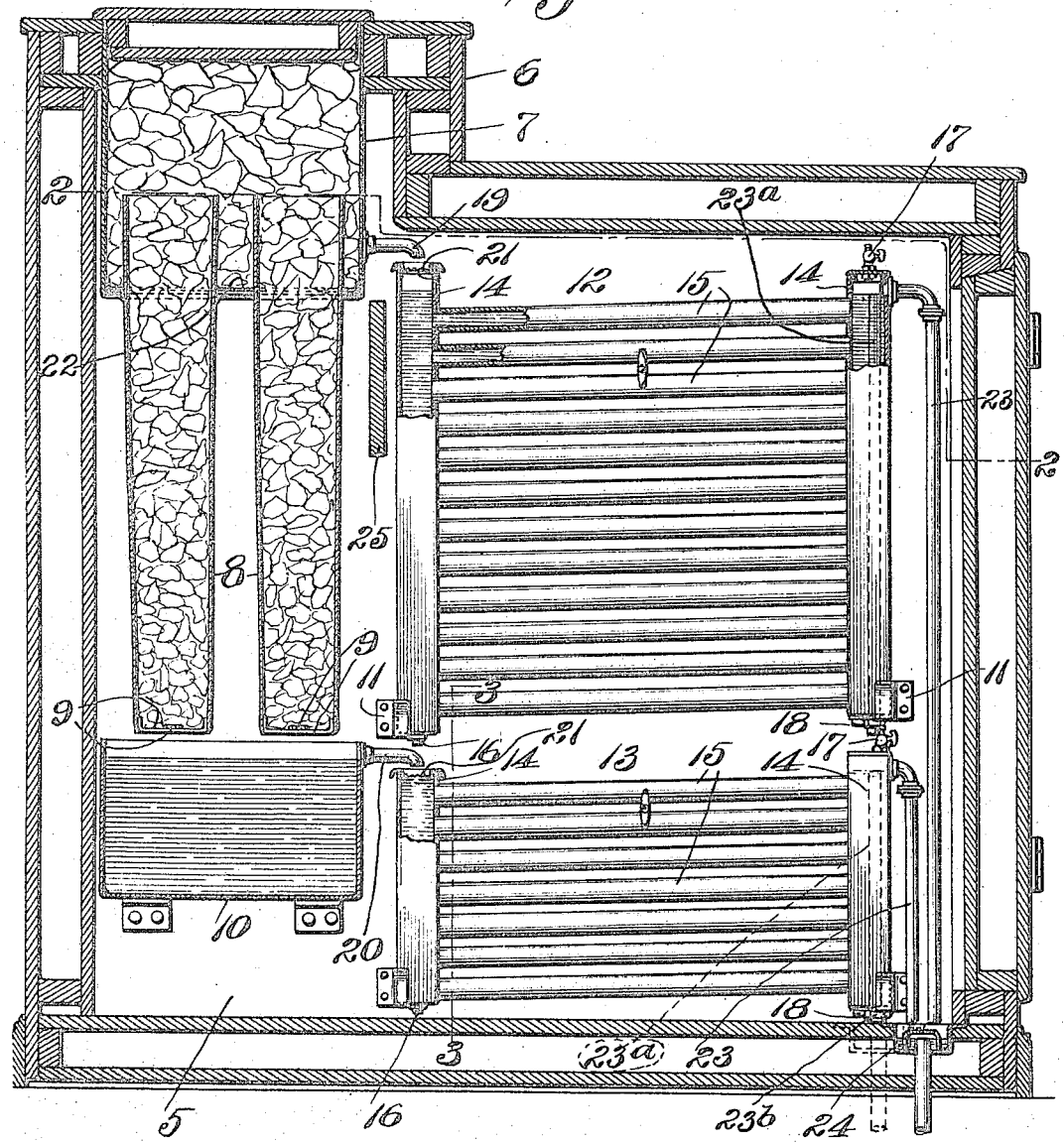

G. J. GRUENDLER.
REFRIGERATOR.
APPLICATION FILED JAN. 11, 1915.

1,173,261.

Patented Feb. 29, 1916.
2 SHEETS—SHEET 1.

Attest:
W. H. Scott.
E. L. Wallace.

Inventor:
Gustav J. Gruendler,
by Higdon & Longan
Attys.

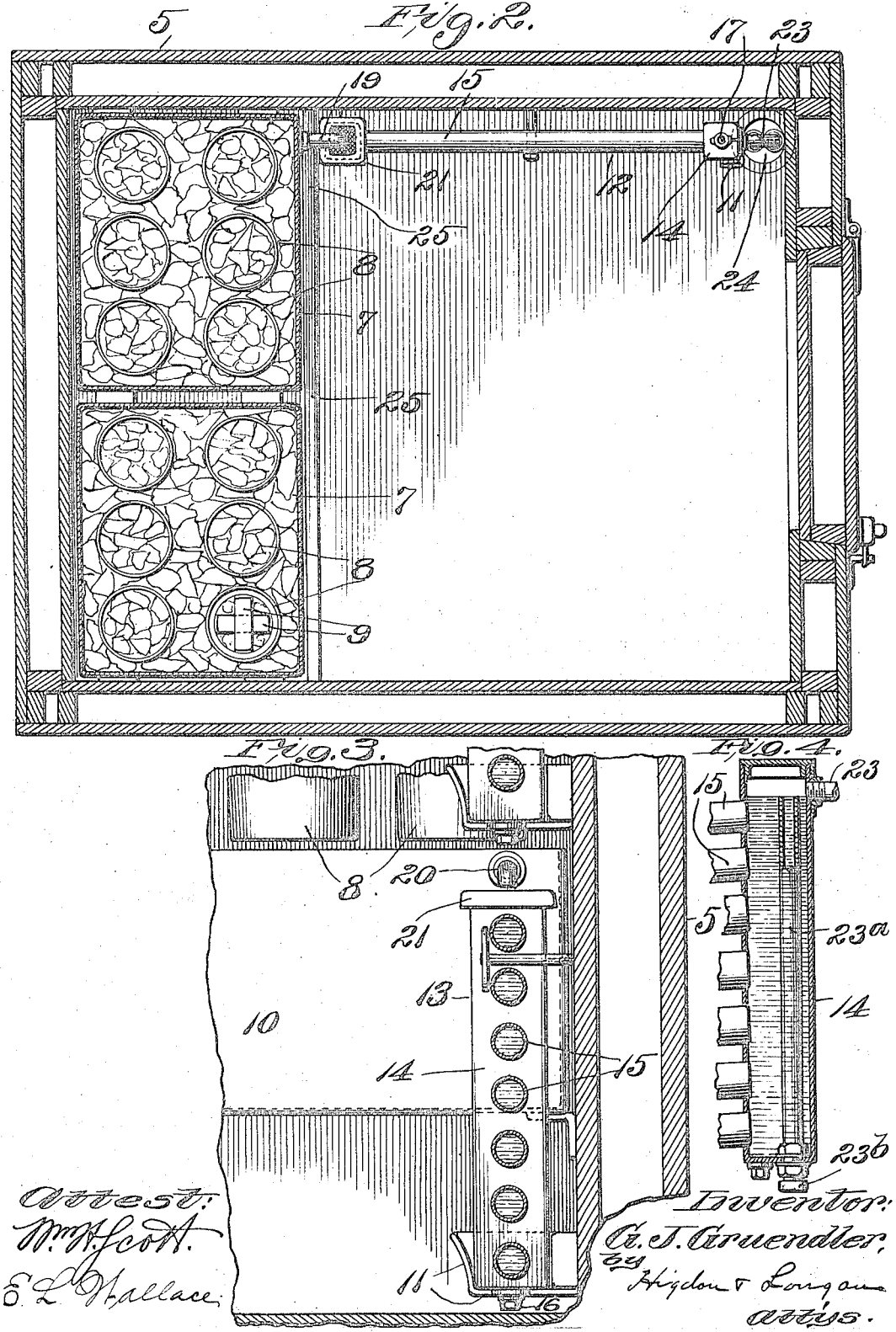

UNITED STATES PATENT OFFICE.

GUSTAV J. GRUENDLER, OF ST. LOUIS, MISSOURI.

REFRIGERATOR.

1,173,261.  Specification of Letters Patent.  Patented Feb. 29, 1916.

Application filed January 11, 1915. Serial No. 1,583.

*To all whom it may concern:*

Be it known that I, GUSTAV J. GRUENDLER, a citizen of the United States, and resident of St. Louis, Missouri, have invented certain new and useful Improvements in Refrigerators, of which the following is a specification containing a full, clear, and exact description, reference being had to the accompanying drawings, forming a part hereof.

My invention relates to improvements in refrigerators, wherein a brine storage battery, operating in conjunction with a salt and ice container and a brine receptacle, affords an increase in radiating surfaces for the cooling of the refrigerator.

The object of my improvements is primarily to provide an improved construction of storage battery for the brine, which is arranged to receive and trap the brine flowing from the salt and ice container and brine receptacle, whereby to utilize the brine to cool a maximum of radiating surface, and which battery may be readily cleaned and repaired.

To the above purposes, my invention consists in certain novel details of the construction and arrangement of parts hereinafter fully described, pointed out in my claim and illustrated by the accompanying drawings, in which:

Figure 1 is a longitudinal, sectional elevation of a refrigerator constructed according to my invention; Fig. 2 is a sectional plan taken on the line 2—2 of Fig. 1; Fig. 3 is a fragmental transverse sectional elevation taken on the line 3—3 of Fig. 1; and Fig. 4 is a vertical sectional elevation through one of the manifolds showing an overflow within the manifold.

Referring by numerals to the accompanying drawings: 5 designates the body of the refrigerator, which in its specific construction forms no part of my invention, and which comprises any desired form of insulated walls and doors for gaining access to the interior of the refrigerator. At the top of this conventional refrigerator body I construct a dome 6, the interior of which is in open communication with the refrigerator body affording a space above the refrigerator body into which the air of highest temperature may rise. The top of the dome 6 is provided with an opening into which is fitted and secured an open topped ice and salt container 7. By preference this container has a number of openings in its bottom to receive the tapering tubes 8, which are open at both ends, the lower open ends having cross bars 9, or similar elements whereby to hold cracked ice within the tubes, yet allow drainage of the water from the molten ice. The upper ends of the tubes extend upwardly into the salt and ice container so that there will be trapped in said container a quantity of brine. Beneath the lower ends of the tubes 8 is a brine receptacle 10, which is open topped and arranged to catch the drainage from all of the said tubes. Secured to the one wall of the refrigerator laterally removed from the salt and ice container, the tubes and brine receptacle, are the wall brackets 11, which provide supports for a brine storage battery comprising the sections 12 and 13. Each of the sections of the battery comprises the manifolds 14 and the connecting tubes 15. The manifolds next adjacent the salt and ice container and the brine receptacle being open topped and having in their bottoms drain-plugs 16, while the opposite manifolds are provided with vent-cocks 17 in their upper ends and drain-plugs 18 in their lower ends. Carried by the salt and ice container near its bottom and by the brine receptacle near its top are the overflow spouts 19 and 20, which, respectively, discharge into the manifolds of the upper and lower sections of the brine storage battery.

In order to prevent sediment from the ice and brine entering the storage battery sections, I provide the sifters 21 in the open tops of the receiving manifolds of the battery sections, and, in order to facilitate cleaning the salt and ice container I arrange in the bottom thereof a screen 22 which will upon removal from the container carry the bulk of sediment with it. The discharging manifolds, that is, the ones farthest removed from the salt and ice container and the brine receptacles each have in communication therewith near their tops an overflow pipe 23, which extend to and discharge into a trapped drain 24.

25 designates an air circulating partition, which extends across the refrigerator body, removed slightly from its top, and between the storage battery and ice tubes, and the function of this partition is to deflect the cold air from the tubes and battery straight downwardly and thus establish a current tending to circulation to prevent "dead air" pockets.

In Figs. 1 and 4 I show an auxiliary overflow pipe 23ª arranged within the manifolds 14, with their upper ends open and at a desired brine level and their lower ends extended through the bottom of the manifold. When used in connection with the overflow pipes 23 I arrange the caps 23ᵇ over the lower ends of the pipes 23ª. By providing the manifold with this internal overflow pipe, the manifold may occupy the full length of the refrigerator space, in which instance the overflow pipes 23 are dispensed with.

Having thus described my invention, what I claim as new therein and desire to secure by Letters Patent of the United States, is:

In combination with a salt and ice container and a brine receptacle each having an overflow pipe, a battery comprising at least two sections, each comprising manifolds with connecting pipes therebetween, one section arranged to receive brine from the salt and ice container and the other brine from the brine receptacle, and means for trapping and overflowing each section.

In testimony whereof, I have signed my name to this specification, in presence of two subscribing witnesses.

GUSTAV J. GRUENDLER.

Witnesses:
R. G. CRAIG,
E. L. WALLACE.